United States Patent [19]

Heger et al.

[11] Patent Number: 5,219,934
[45] Date of Patent: Jun. 15, 1993

[54] POLYMERS CONTAINING SULFONAMIDE UNITS AS COMPATIBILIZERS FOR POLYAMIDE/POLYCARBONATE BLENDS

[75] Inventors: Georg Heger, Krefeld; Holger Lütjens, Cologne; Gerd Fengler, Krefeld; Karl-Erwin Piejko, Bergisch-Gladbach; Josef Buekers, Krefeld, all of Fed. Rep. of Germany

[73] Assignee: Bayer Aktiengesellschaft, Leverkusen, Fed. Rep. of Germany

[21] Appl. No.: 840,004

[22] Filed: Feb. 24, 1992

[30] Foreign Application Priority Data

Mar. 8, 1991 [DE] Fed. Rep. of Germany ....... 4107397

[51] Int. Cl.⁵ .................... C08L 69/00; C08L 77/00
[52] U.S. Cl. ........................ 525/66; 525/67; 525/133; 525/146; 525/148; 525/425; 525/433; 526/288
[58] Field of Search ............ 525/66, 67, 133, 146, 525/148, 425, 433; 526/288

[56] References Cited

U.S. PATENT DOCUMENTS

| | | | |
|---|---|---|---|
| 2,324,896 | 7/1943 | Zerweck | 526/288 |
| 4,218,357 | 8/1980 | Mark et al. | 260/30.8 R |
| 4,335,254 | 6/1982 | Wilson et al. | 560/138 |
| 4,578,444 | 3/1986 | Rossi | 526/288 |
| 4,782,114 | 11/1988 | Perron | 525/146 |
| 4,877,848 | 10/1989 | Maresca | 525/433 |
| 4,882,894 | 11/1989 | Havens | 524/159 |
| 4,883,836 | 11/1989 | Thill | 525/66 |
| 5,041,479 | 8/1991 | Ogoe | 524/168 |

FOREIGN PATENT DOCUMENTS 265846  5/1988  European Pat. Off. ............ 526/288

*Primary Examiner*—David J. Buttner
*Attorney, Agent, or Firm*—Connolly & Hutz

[57] ABSTRACT

The invention relates to compatible blends having good surfaces of aromatic polycarbonates or poly(ester) carbonates and polyamides and, optionally, graft polymers and typical additives with addition of polymers containing sulfonamide units as compatibilizers, to a process for the production of these blends and to their use for the production of moldings having good surface properties.

18 Claims, No Drawings

POLYMERS CONTAINING SULFONAMIDE UNITS AS COMPATIBILIZERS FOR POLYAMIDE/POLYCARBONATE BLENDS

This invention relates to compatible blends having good surfaces of aromatic polycarbonates or poly(ester) carbonates and polyamides and, optionally, graft polymers and typical additives with addition of polymers containing sulfonamide units as compatibilizers, to a process for the production of these blends and to their use for the production of moldings having good surface properties.

Binary molding compounds of polycarbonates and polyamides cannot be processed as thermoplastics without additives. In extruders, the melt foams because the polycarbonate is degraded by the polyamide. Accordingly, preference is attributed to polyamides having low terminal group contents, for example 20 milliequivalents/kg (see U.S. Pat. No. 4,732,934 and EP 285 693).

J 85/31 224 describes blends of polyamide, polycarbonate, polyacrylate without reactive groups and polyphenylene (ester) ethers which can be processed in extruders. U.S. Pat. No. 4,883,836 claims polyamide/polycarbonate blends containing polyalkyl oxazoline as compatibilizer. However, the molding compounds of both applications show surface defects which are attributable to the incompatibility of the polycondensates.

According to EP 227 053, compatible blends can be produced from polyamide and aromatic polycarbonate using polycondensates based on glycidyl-terminated bisphenols. J 63/314 270 describes polyamide/polycarbonate blends containing copolymers based on polyolefin/glycidyl methacrylate.

The incompatibility of the two systems is reflected in the poor toughness of the blends which rules out broad-spectrum application on an industrial scale.

J 59/213 751 claims molding compounds based on polyamide, polycarbonate and polyolefin- or polyacrylate-based graft rubber. According to WO 88/02 387, high-quality polyamide/polycarbonate blends are obtained by the use of special compatibilizers, such as polyester amides, ABS, MBS, EPM rubber or polymethyl methacrylate. However, the addition of the soft polymers reduces heat resistance or leads to inadequate improvements in toughness.

Accordingly, the problem addressed by the present invention was to provide thermoplastically processable molding compounds of polyamide and polycarbonate which would not show any delamination, i.e. would have defect-free surfaces. In addition, the blends would combine high toughness with increased heat resistance.

This problem has been solved by the molding compounds according to the invention which consist of polyamide, polycarbonate or polyester carbonate, polymers containing sulfonamide units and, optionally, elastomers.

Accordingly, the present invention relates to mixtures containing

A) 5 to 70% by weight, preferably 10 to 60% by weight and, more preferably, 15 to 50% by weight polyamide, B) 94 to 10% by weight, preferably 87 to 25% by weight and, more preferably, 80 to 40% by weight thermoplastic aromatic polyester carbonate or polycarbonate, C) 1 to 20% by weight, preferably 3 to 15% by weight and, more preferably, 5 to 10% by weight of a homo- or copolymer of a radical-polymerizable sulfonamide monomer and optionally another sulfonamide-free vinyl monomer and, optionally, D) elastomers and also typical additives.

so that A), B), C) and D) add up to 100% by weight.

The present invention also relates to the use of the polymers blends of components A) to D) for the production of thermoplastic molding compounds and to a process for the production of the blends.

The polyamide component A) of the molding compound blend according to the invention may be selected from any partly crystalline or amorphous polyamides, particularly those containing reduced numbers of terminal amino groups.

Suitable partly crystalline polyamides are, for example, polyamide-6, polyamide-6,6, polyamide-4,6 and partly crystalline copolyamides based on these components. Other suitable partly crystalline polyamides are, for example, those of which the acid component consists in particular completely or partly (besides adipic acid or ε-caprolactam) of terephthalic acid and/or isophthalic acid and/or suberic acid and/or sebacic acid and/or azelaic acid and/or dodecane dicarboxylic acid and/or adipic acid and/or a cyclohexane dicarboxylic acid, and of which the diamine component consists completely or partly of, in particular, m- and/or p-xylylene diamine and/or tetramethylene diamine and/or hexamethylene diamine and/or 2,2,4- and/or 2,4,4-trimethyl hexamethylene diamine and/or isophorone diamine and of which the compositions are known from the prior art.

Partly crystalline polyamides produced completely or partly from $C_{6-12}$ lactams, optionally using one or more of the starting components mentioned above, are also mentioned as examples.

Particularly preferred partly crystalline polyamides A) are polyamide-6 and polyamide-6,6 or mixtures or copolyamides thereof containing only small percentages by weight (up to about 15% by weight) of the co-components.

The polyamide component A) may also be an amorphous polyamide. Amorphous polyamides are obtained by polycondensation of diamines, for example ethylene diamine, tetramethylene diamine, hexamethylene diamine, decamethylene diamine, 2,2,4- and/or 2,4,4-trimethyl hexamethylene diamine, m- and/or p-xylylene diamine, bis-(4-aminocyclohexyl)-methane or mixtures of 4,4'- or 2,2'-diaminodicyclohexyl methanes, 2,2-bis-(4-aminocyclohexyl)-propane, 3,3'-dimethyl-4,4'-diaminodicyclohexyl methane, 3-aminoethyl-3,5,5-trimethyl cyclohexylamine,2,5- and/or 2,6-bis-(aminomethyl)-norbornane and/or 1,4-diaminomethyl cyclohexane, with dicarboxylic acids, for example oxalic acid, adipic acid, azelaic acid, decane dicarboxylic acid, heptadecane dicarboxylic acid, 2,2,4- and/or 2,4,4-trimethyl adipic acid, isophthalic acid or small quantities of terephthalic acid. Amorphous copolymer obtained by polycondensation of several monomers are of course also suitable, as are copolymers prepared with addition of aminocarboxylic acids, such as ω-aminocaproic acid, ω-aminoundecanoic acid or ω-aminolauric acid, or lactams thereof.

Instead of using pure 4,4'-diaminodicyclohexyl methane, it is also possible to use mixtures of the positionisomeric diaminodicyclohexyl methanes which consist of 70 to 99 mol-% of the 4,4'-diamino isomer.
1 to 30 mol-% of the 2,4'-diamino isomer.
0 to 2 mol-% of the 2,2'-diamino isomer and, optionally, correspondingly more highly condensed diamines which are obtained by hydrogenation of technical-quality diaminodiphenyl methane.

For amorphous polyamides, at least one of the abovementioned components, such as diamines or dicarboxylic acids, is asymmetrical and contains side chains.

Particularly suitable amorphous polyamides are polyamides produced from isophthalic acid, tetramethylene diamine and/or hexamethylene diamine and other diamines, such as 4,4'-diaminodicyclohexyl methane, isophorone diamine, 2,2,4- and/or 2,4,4-trimethyl hexamethylene diamine, 2,5- and/or 2,6-bis-(aminomethyl)-norbornane; or from isophthalic acid, 4,4'-diaminodicyclohexyl methane and ε-caprolactam; or from isophthalic acid, 3,3'-dimethyl-4,4'-diaminodicyclohexyl methane and lauric lactam; or from terephthalic acid and the isomer mixture of 2,2,4- and/or 2,4,4-trimethyl hexamethylene diamine.

Mixtures of partly crystalline and amorphous polyamides, particularly mixtures containing 20 to 97% by weight partly crystalline polyamides and 3 to 20% by weight amorphous polyamides, may also be used.

According to the invention, preferred polyamides A) are polyamides having such a low concentration of terminal amino groups that there is no significant degradation of the polycarbonate or polyester carbonate, i.e. no reduction in the viscosity or average molecular weight $M_w$ of more than 20%, as reflected in the uniform toughness of the blends. Polyamides such as these can be obtained by end-capping of the reactive terminal amino groups of the polymers (by typical chain terminators, for example monocarboxylic acids, such as propionic acid) either at the polyamide stage or even during polymerization of the polyamide under suitable conditions known to the expert. Minimal terminal amino group contents are, in particular, $\leq 30$ milliequivalents/kg and, more particularly, $\leq 20$ milliequivalents/kg.

The number of terminal amino groups can also be reduced at the polyamide stage by a series of end-capping reactions in accordance with the prior art (see EP 143 037, 188 328; DE 19 12 549, 19 58 306; U.S. Pat. Nos. 3,383,391, 3,890,286). Reactions of the type in question are, for example, the reaction with carboxylic anhydrides, acid chlorides ($R^1COCl$), carboxylic acids, carboxylic acid esters, carboxylic acid amides $R^1CONR^1R^1$ or oxazolinones and also the reaction with carbonates ($R^1CO(CO)OR^1$) with isocyanates or with carbodiimides to form guanidines. Other reactions worth mentioning are the reaction of the terminal amino groups with aldehydes or acetals to form imines and also the reaction with epoxides and oxazolines or addition onto olefinic double bonds $R^2CH=CHR^2$ ($R^1$ = saturated or unsaturated aliphatic or aromatic hydrocarbon; $R^2=R^1$, $-(C=O)R^3$, $-(C=O)OR^1$, $-(C=O)OH$, $-CHO$, $-(C=O)NR^1R^1$; $R^3$ = linear or branched $C_{2-15}$ alkyl radicals, $C_{3-18}$ cycloalkyl, $C_{6-20}$ aryl). In addition, copolymers containing the abovementioned reactive groups are mentioned in regard to the end-capping reaction and include, for example, styrene/maleic acid copolymers (Dylark ®, Cadon ®), copolymers based on α-olefins or alkyl vinyl ethers and maleic anhydride (Gantrez ®), maleic-anhydride-modified olefins (for example U.S. Pat. No. 3,560,457, Hercoprime ®, Plexar ®) and EP(D)M rubbers (Exxelor ®, for example Exxelor VA 1803 (Exxon) polybutadiene/styrene/ maleic anhydride terpolymers (Ricon ®) or polycondensates of 2,2-di-(4-hydroxyphenyl)-propane and also epichlorohydrin and the like.

The polyamides A may also consist of mixtures of a copolyamide consisting of recurring units derived from adipic acid and hexamethylene diamine and units derived from ε-caprolactam and polyhexamethylene adipic acid amide, as described in DE-OS 37 35 404, or of partly crystalline and amorphous polyamides, in which case the amorphous polyamide component is preferably smaller than the partly crystalline polyamide component, amounting in particular to between 3 and 20% by weight.

Partly crystalline polyamides based on polyamide-6, polyamide-6,6 and partly crystalline polyamides based on these principal components with addition of co-components of the type mentioned are preferred.

The thermoplastic aromatic polycarbonates or copolycarbonates or (co)poly(ester) carbonates suitable as component B) of the blends are synthesized by standard methods from known components (for example diphenols and active carbonic acid derivatives).

Examples of HO-Ar-OH are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, pentamethyl-(hydroxyphenyl)-indanol, α,α'-bis-(hydroxyphenyl)-diisopropyl benzenes and nucleus-alkylated and nucleus-halogenated compounds thereof.

These and other suitable aromatic dihydroxy compounds are described, for example, in U.S. Pat. Nos. 3,028,365, 2,999, 835, 3,148,172, 3,271,268, 2,991,273, 3,271,367, 3,780,078, 3,014,891, 2,999,846, in DE-OSS 15 70 703, 20 36 052, 20 63 050, 22 11 957, 24 02 175, 24 02 176, 24 02 177, in FR-PS 1 561 518, in the book by H. Schnell entitled "Chemistry and Physics of Polycarbonates", Polymer Reviews 9, Interscience Publishers, New York, 1964 and in V. Serini, D. Freitag and H. Vernaleken "Polycarbonate aus o,o,o',o'-tetramethyl-bis-phenolensubstituierten Bisphenolen", Angewandte Makromolekulare Chemie 55 (1976), 175–189.

Preferred diphenols are hydroquinone, bis-(4-hydroxyphenyl),2,2-bis-(4-hydroxyphenyl)-propane,bis-(4-hydroxyphenyl)-sulfide, bis-(4-hydroxyphenyl)-ether, bis-(4-hydroxyphenyl)-ketone, bis-(4-hydroxyphenyl)-sulfone, bis(4-hydroxyphenyl)-methane, 1,1-bis-(4-hydroxyphenyl)cyclohexane, α,α'-bis-(4-hydroxyphenyl)-p-diisopropyl benzene, 1,1-bis-(4-hydroxyphenyl)-1-phenyl ethane, 2,2-bis-(3',5'-dichloro-4'-hydroxyphenyl)-propane, 2,2-bis(3,5-dibromo-4-hydroxyphenyl)-propane, 2,2-bis-(3,5-di-methyl-4-hydroxyphenyl)-propane, bis-(3,5-dimethyl-4-hydroxyphenyl)-methane,bis-(3,5-dimethyl-4-hydroxyphenyl)-butane, bis-(3,5-dimethyl-4-hydroxyphenyl), 1,1,3,4,6-pentamethyl-3-(3,5-dimethyl-4-hydroxyphenyl)-indan-5-ol, 1,1-bis-(4-hydroxyphenyl)-3,3-dimethyl cyclohexane, 1,1-bis-(4-hydroxyphenyl)-3-methyl cyclohexane, 1,1-bis-(4-hydroxyphenyl)-3-methyl cyclohexane.

Particularly preferred diphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4- hydroxyphenyl)propane, 1,1-bis-(4-hydroxy-phenyl)-cyclohexane and 1,1-bis-(4-hydroxyphenyl)-3,3,5-trimethyl cyclohexane.

2,2-Bis-(4-hydroxyphenyl)-propane and 1,1-bis-(4-hydroxyphenyl)-3,3,5-trimethyl cyclohexane are particularly preferred.

One or more diphenols may be used. They may be prepared in known manner by condensation of phenols and ketones.

The (co)polycarbonates B) used may be produced in known manner, preferably by the interfacial process (cf. H. Schnell "Chemistry and Physics of Polycarbonates", Polymer Reviews, Vol. IX, pages 33 et sec., Interscience Publ., 1964). To this end, the diphenols are dissolved in aqueous alkaline phase. Mixtures of diphenols are used for the production of copolycarbonates. Chain terminators may be added to regulate molecular weight. The diphenols are then reacted with phosgene by the interfacial condensation method in the presence of an inert organic phase which preferably dissolves polycarbonate. The reaction temperature is in the range from 0° to 40° C.

Small quantities, preferably 0.05 to 2.0 mol-% (based on the diphenols used), of trifunctional or more than trifunctional compounds, particularly those containing three or more than three phenolic hydroxyl groups, may optionally be used in known manner as branching agents to obtain branched polycarbonates. Some of the compounds containing three or more than three phenolic hydroxyl groups which may be used are phloroglucinol, 4,6-dimethyl-2,4,6-tri-(4-hydroxyphenyl)-hept-2-ene, 4,6-dimethyl-2,4,6-tri-(4-hydroxyphenyl)-heptane,1,3,5-tri-(4-hydroxyphenyl)benzene, 1,1,1-tri-(4-hydroxyphenyl)-ethane, tri-(4-hydroxyphenyl)-phenyl methane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5'-methylbenzyl)-4-methyl phenol , 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene.

Some of the other trifunctional compounds are 2,4dihydroxy benzoic acid, trimesic acid, cyanuric chloride and 3,3-bis-(3-methyl-4-hydroxyphenyl)-2-oxo-2,3-dihydroindole.

The 0.05 to 2 mol-% branching agents optionally used may either be initially introduced with the diphenols in the aqueous alkaline phase or may be added in solution in the organic solvent before the phosgenation.

In addition to the diphenols it is also possible to use mono- and/or bis-chlorocarbonic acid esters thereof which are added in solution in organic solvents. In that case, the quantity of chain terminators and branching agents is determined by the mols of diphenolate structural units; similarly, where chlorocarbonic acid esters are used, the quantity of phosgene may be correspondingly reduced in known manner.

Suitable organic solvents for dissolving the chain terminators and, optionally, the branching agents and the chlorocarbonic acid esters are, for example, methylene chloride, chlorobenzene, acetone, acetonitrile or mixtures of these solvents, more particularly mixtures of methylene chloride and chlorobenzene. The chain terminators and branching agents used may optionally be dissolved in the same solvent.

The organic phase for the interfacial polycondensation may consist, for example, of methylene chloride, chlorobenzene and mixtures of methylene chloride and chlorobenzene.

Aqueous NaOH solution, for example, is used as the aqueous alkaline phase.

The production of the polycarbonates B) by the interfacial method may be catalyzed in the usual way by such catalysts as tertiary amines, more particularly tertiary aliphatic amines, such as tributyl amine or triethyl amine. The catalysts may be used in quantities of 0.05 to 10 mol-%, based on mols of diphenols used. The catalysts may be added before the beginning of phosgenation or during or even after phosgenation. The polycarbonates are isolated in known manner.

The high molecular weight aromatic polycarbonates may also be produced by the known homogeneous phase process, by the so-called "pyridine process" and by the known melt transesterification process, for example using diphenyl carbonate instead of phosgene.

The polycarbonates B) used preferably have molecular weights Mw (weight average, as determined by gel chromatography after calibration) of at least 12,000, preferably in the range from 12,000 to 220,000 and more preferably in the range from 20,000 to 100,000. They may be linear or branched and are homopolycarbonates or copolycarbonates based on the diphenols mentioned.

Suitable aromatic dicarboxylic acids optionally used for the production of (co)polyester carbonates B) are, for example, oxalic acid, malonic acid, succinic acid, glutaric acid, adipic acid, pimelic acid, suberic acid, azelaic acid, sebacic acid, nonane dicarboxylic acid, decane dicarboxylic acid, dodecane dicarboxylic acid, octadecane dicarboxylic acid, dimethyl malonic acid, dimer fatty acid, 1,4-cyclohexane dicarboxylic acid, tetrahydro-terephthalic acid, tetrahydroisophthalic acid, tetrahydrophthalic acid, 3,6-endomethylene tetrahydrophthalic acid, o-, m-, p-phenylene diacetic acid, orthophthalic acid, terephthalic acid, isophthalic acid, tert.-butyl isophthalic acid, 3,3'-diphenyl dicarboxylic acid, 4,4'-diphenyl dicarboxylic acid, 4,4'-benzophenone dicarboxylic acid, 3,4'-benzophenone dicarboxylic acid, 4,4'-diphenyl ether dicarboxylic acid, 4,4'-diphenyl sulfone dicarboxylic acid, 2,2-bis-(4-carboxyphenyl)-propane, trimethyl-3-phenylindane-4,5'-dicarboxylic acid. Of the aromatic dicarboxylic acids, terephthalic acid and/or isophthalic acid are particularly preferred.

Preferred (co)polyester carbonates B) are those in which the dicarboxylic acids are present in a quantity of 5 to 98 mol-%, preferably in a quantity of 20 to 50 mol-% and 60 to 95 mol-% and, more preferably, in a quantity of 25 to 45 mol-% and 75 to 95 mol-%, based on the sum of the dicarboxylic acids and the carbonic acid. They may be produced by methods of the type known from the literature for the production of polyester carbonates, for example by processes in homogeneous solution, by the melt transesterification process and by the two-phase interfacial process. Melt transesterification processes are preferred, the two-phase interfacial process being particularly preferred.

Melt transesterification processes (acetate process and phenyl ester process) are described, for example, in U.S. Pat. Nos. 3,494,885, 4,386,186, 4,661,580, 4,680,371 and 4,680,372, in EP-A 26 120, 26 121, 26 684, 28 030, 39 845, 91 602, 97 970, 79 075, 146 887, 156 103, 234 913, 234 919 and 240 301 and in DE-A 1 495 626 and 2 232 877. The two-phase interfacial process is described, for example, in EP-A 68 014, 88 322, 134 898, 151 750, 182 189, 219 708, 272 426, in DE-A 2 940 024, 3 007 934, 3 440 020 and in Polymer Reviews, Volume 10, "Condensation Polymers by Interfacial and Solution Methods", Paul. W. Morgan, Interscience Publishers, New York, 1965, Chapter VIII, page 325, Polyesters.

In the acetate process, bisphenol diacetate or bisphenol and acetanhydride and also aromatic dicarboxylic acid are generally condensed with elimination of acetic acid to form the polyester. In the phenyl ester process, bisphenol, aromatic dicarboxylic acid or diphenyl ester of the aromatic dicarboxylic acid and, optionally, diphenyl carbonate are generally reacted with elimination of phenol and, optionally, $CO_2$ to form the polyester or polyester carbonate.

In the two-phase interfacial process, alkali metal bisphenolate, aromatic dicarboxylic acid dichloride and, optionally, phosgene are generally used as starting materials for the production of polyester carbonates B). The poly(ester) carbonate copolymers are produced in this condensation reaction with formation of alkali metal chloride. In general, the salt formed is dissolved in the aqueous phase while the polyester formed or the polycarbonate formed is dissolved in the organic phase.

The polyester carbonates are isolated in known manner by removing the organic phase obtained in the interfacial process, washing it until it is neutral and free from electrolyte and then precipitating it, for example from organic phase with addition of a non-solvent, and drying the product obtained.

Component C) of the polymer blends according to the invention may be a homopolymer or copolymer of a radical-polymerizable sulfonamide monomer and, optionally, other sulfonamide-free vinyl monomers. Sulfonamide monomers are vinyl monomers containing structural units corresponding to formula (I):

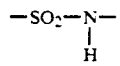  (I)

Preferred sulfonamide monomers are vinyl monomers corresponding to formulae (II) and (III)

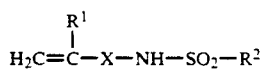  (II)

  (III)

in which
$R^1$ = H, methyl,
X = single bond, $C_{1-8}$ alkylene, difunctional aromatic $C_{6-25}$ hydrocarbon radical,

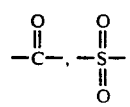

$R^2$ = $C_{1-12}$ alkyl, monofunctional aromatic $C_{6-25}$ hydrocarbon radical,
Y = single bond, $C_{1-8}$ alkylene, difunctional aromatic $C_{6-25}$ hydrocarbon radical

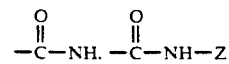

with Z = difunctional aromatic $C_{6-25}$ hydrocarbon radical,

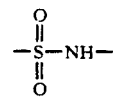

$R^3$ = hydrogen, $C_{1-12}$ alkyl (linear or branched), monofunctional aromatic $C_{6-25}$ hydrocarbon radical,

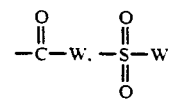

with W = $C_{1-12}$ alkyl or a monofunctional aromatic $C_{6-25}$ hydrocarbon radical.

Particularly preferred sulfonamide monomers are vinyl monomers corresponding to formulae (II) and (III) in which
$R^1$ = H, $CH_3$
X = single bond, $C_{1-4}$ alkylene, difunctional aromatic $C_{6-15}$ and preferably $C_{6-9}$ hydrocarbon radical

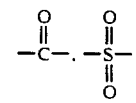

$R^2$ = $C_{1-8}$ alkyl, preferably $C_{1-4}$ alkyl, a monofunctional aromatic $C_{6-15}$ and preferably $C_{6-9}$ hydrocarbon radical,
Y = single bond, $C_{1-4}$ alkylene, a difunctional aromatic $C_{6-15}$ and preferably $C_{6-9}$ hydrocarbon radical,

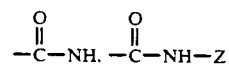

with Z = a difunctional aromatic $C_{6-15}$ and preferably $C_{6-9}$ hydrocarbon radical,

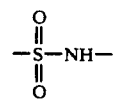

$R^3$ = hydrogen, $C_{1-8}$ alkyl, preferably $C_{1-4}$ alkyl, a mono functional $C_{6-15}$ and preferably $C_{6-9}$ hydrocarbon radical,

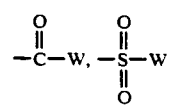

with W = $C_{1-8}$ alkyl, preferably $C_{1-4}$ alkyl, or a monofunctional aromatic $C_{6-15}$ and preferably $C_{6-9}$ hydrocarbon radical.

The following are examples of suitable sulfonamide monomers corresponding to formulae (II) and (III):

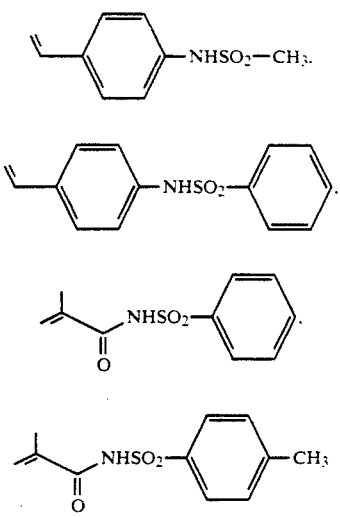

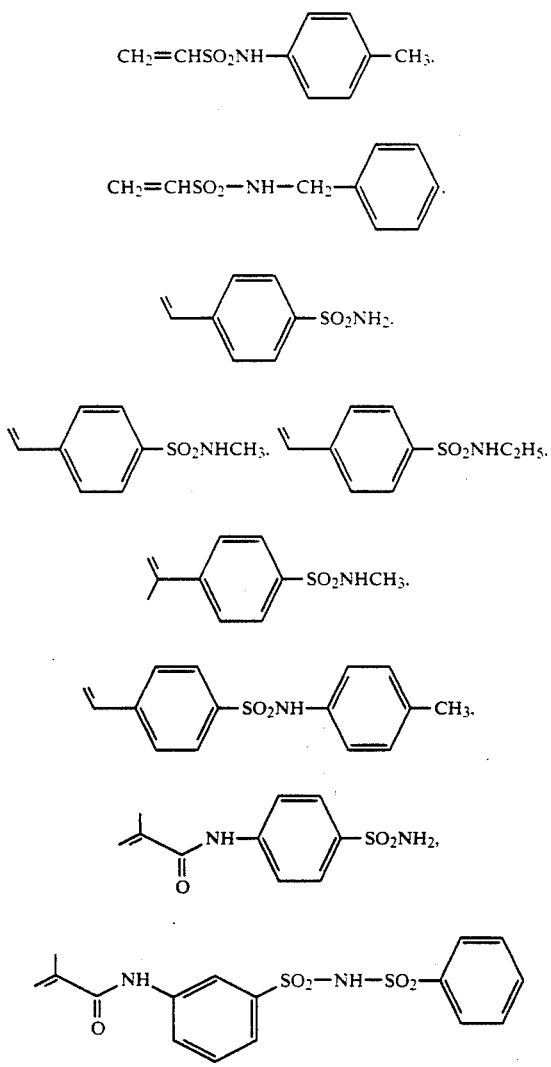

Sulfonamide-free vinyl monomers are, for example, a) vinyl compounds, such as sytrene, α-methyl styrene, halostyrenes, methoxystyrenes, b) vinyl halides, such as vinyl chloride, vinyl fluoride, vinylidene chloride, c) vinyl alkyl ketones, such as vinyl methyl ketone, d) vinyl esters of organic acids, such as for example vinyl acetate, vinyl butyrate, vinyl propionate, e) α,β-unsaturated carboxylid acids, such as acrylic acid, methacrylic acid, itaconic acid, maleic acid, f) derivatives of acrylic acid and methacrylic acid, such as acrylonitrile, methacrylonitrile, acrylic acid amide, methacrylic acid amide, N-methylol acrylamide, N-methylol methacrylamide, dimethylaminopropyl amide, g) $C_{1-4}$ alkyl acrylates, such as methyl, ethyl, n-, iso- or tert. butly acrylate, octyl acrylate, 2-ethyl hexyl acrylate, chloroethyl acrylate, benzyl acrylate, phenyl ethyl acrylate;

h) polymerizable olefins and dienes, such as isobutylene, butadiene, isoprene, propylene, chloroprene; and, for example, i) vinyl alkyl ethers.

The homopolymers or copolymers C) preferably contain structural units corresponding to formula (IV) and/or (V)

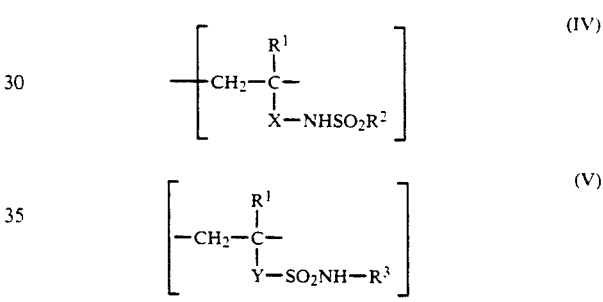

in which $R^1$, X, $R^2$, Y and $R^3$ are as defined for formulae (II) and (III), in quantities of 1 to 100% by weight and preferably in quantities of 5 to 100% by weight.

The homopolymers or copolymers C) may be prepard in known manner by polymerization of a radical-polymerizable sulfonamide monomer containing structural units corresponding to formula (I), preferably sulfonamide monomers corresponding to formula (II) and (III), and optionally the sulfonamide-free vinyl monomers mentioned above.

The polymerization is preferably carried out as solution, suspension or emulsion polymerization and preferably in the presence of radical initiators. Suitable radical initiators are, for example, compounds containing azo groups, such as azoisobutyrodinitrile, 4,4-azobis-(4-cyanovaleric acid), organic peroxides, such as benzoyl peroxide, tert. butyl hydroperoxide, dibenzoyl peroxide, and inorganic peroxide salts, such as potassium peroxodisulfate, ammonium peroxodisulfate.

If polymerization is carried out in solution, the solvents used may be solvents in which only the monomers are soluble or solvents in which both the monomers and the polymers are soluble. Suitable organic solvents are, for example, butanol, methyl ethyl ketone, ethyl benzene.

If polymerization is carried out in (aqueous) emulsion, the monomers are bet emulsified with emulsifiers, for example anionic, cationic or nonionic emulsifiers, such as for example sodium, potassium, ammonium salts of fatty acids, sodium lauryl sulfate, the sodium salt of $C_{14-18}$ alkyl sulfonic acids, oleyl or octadecyl alcohol.

Polymerization is advantageously carried out at elevated temperature, for example at $+30°$ C. to $+90°$ C. and more particularly at $+60°$ C. to $+85°$ C. The molecular weight of the homopolymers or copolymers C) may be adjusted in known manner through the polymerization temperature, the concentration of monomers and the quantity of catalyst and also by means of molecular weight regulators. Preferred molecular weight regulators are organosulfur compounds, for example mercaptans or disulfides, more particularly long-chain mercaptans, such as n- and tert. dodecyl mercaptans.

They are normally dissolved in the monomer. The molecular weights $\overline{M}_w$ (weight average) of the polymers according to the invention (as determined by light scattering or sedimentation) are in the range from 1,000 to 5,000,000 g/mol.

Typical impact modifiers known from the literature, for example EP(D)M, acrylate and butadiene rubbers, grafted with suitable monomers, as frequently described in the literature, etc., may also be added to the blends according to the invention, preferably in quantities of 3 to 20% by weight, based on the blend; other typical additives, for example lubricants and mold release agents, nucleating agents, plasticizers, stabilizers, flameproofing additives, antidripping agents, fillers and reinforcing materials, including reinforcing fibers, dyes, pigments and also heat stabilizers, UV absorbers, antioxidants and/or light stabilizers, may also be added to the blends according to the invention.

These additives may either be added to components A), B) or C) or to the binary mixtures of A) and B) or A) and C) or B) and C) in the usual quantities before the production of the blends according to the invention or may be subsequently incorporated in the blends according to the invention. The additives may also be incorporated in the form of master batches. The quantity in which the additives are used is gauged in such a way that the additives are able to develop the desired effect in the blend; it may readily be determined by preliminary tests.

The blends according to the invention may be processed by any of the standard methods for the production of moldings.

EXAMPLES

Substances used (components)

A. Polyamide-6 having a relative viscosity of 4.0 (as measured on a 1% by weight solution in m-cresol at 25° C.)

B. Thermoplastic aromatic polycarbonate based on 2,2-bis-(4-hydroxyphenyl)-propane having a viscosity of 1.28 (as measured on a 0.5% by weight solution in methylene chloride)

C. Sulfonamide polymers:

C.1 Homopolymer prepared by solution polymerization of the monomer corresponding to formula (IIa)

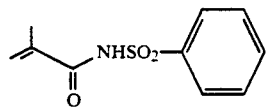

$[\eta]$ DMF $= 0.45$ dl/g
$[\eta]$ = intrinsic viscosity, as measured in dimethyl formamide at 25° C.

C.2 Copolymer prepared by solution polymerization of a monomer mixture of methyl methacrylate and the monomer corresponding to formula (IIa) in a ratio by weight of 70:30 in methyl ethyl ketone.

C.3 Copolymer prepared by solution polymerization of a monomer mixture of methyl methacrylate and the monomer corresponding to formula (IIa) in a ratio by weight of 85:15 in methyl ethyl ketone.

$[\eta] =$ DMF 0.42 dl/g

D. Rubbers:

D.1 EPM rubber produced from 45% by weight ethene, 54.3% by weight propene and 0.7% by weight maleic anhydride having a density of 0.87 g/cm ("Exxelor ®VA 1803, a product of EXXON).

D.2 Graft polymer prepared by grafting of 40% by weight of a monomer mixture of 72% by weight styrene and 28% by weight acrylonitrile onto 60% by weight of a crosslinked particulate n-butyl acrylate rubber having a particle size ($d_{50}$ value) of 480 nm and a gel content of 90% by weight (as measured in DMF). (The graft polymer has a core/shell structure from the method used for its production).

Production and testing of the molding compounds:

I) Polyamide A) and the rubber impact modifier D) were melted in a continuous-action twin-screw extruder and homogenized in the melt. The cylinder temperatures were selected so that melt temperatures of 260° to 300° C. were maintained. The melt strand was spun off into water, granulated and dried.

II) The master batch from I) was melted with the polycarbonate B), a sulfonamide polymer C) and, optionally, another modifier D) or additives and the resulting melt homogenized. The cylinder temperatures were selected so that melt temperatures of 270° to 340° C. were maintained. The melt strand was spun off into water, granulated and dried.

Test bars measuring 80 mm×10 mm×4 mm and color sample platelets measuring 60 mm×40 mm×4 mm are made from the molding compounds in a standard injection-molding machine and are used to determine modulus of elasticity in bending (DIN 53 457) and heat resistance (HDT-A on test specimens laid out flat for an outer fiber strain of 0.2% in accordance with ISO 25) and also Izod impact strength and notched impact strength (ISO 180). Surface quality was evaluated from the sample platelets.

TABLE 1

Composition of the molding compounds (quantities in % by weight)

| Example | A | B | $C^1$ | $C^2$ | $C^3$ | $D^1$ | $D^2$ |
|---|---|---|---|---|---|---|---|
| 1* | 36.2 | 53.8 | — | — | — | 7 | — |
| 2 | 34.2 | 51.3 | 5 | — | — | 9.5 | — |
| 3 | 33.0 | 39.8 | — | 8 | — | 9.2 | 10 |
| 4 | 33.0 | 49.8 | — | 8 | — | 9.2 | — |
| 5 | 33.0 | 39.8 | — | — | 8 | 9.2 | 10 |
| 6 | 33.0 | 49.8 | — | — | 8 | 9.2 | — |

TABLE 2

Test results of the molding compounds

| Example | E modulus in bending [N/mm$^2$] | $a_n^+$ [kJ/m$^2$] | $a_k^+$ [kJ/m$^2$] | HDT-A [°C.] | Surface |
|---|---|---|---|---|---|
| 1* | 2261 | 26 | 2.9 | 120 | Delaminated |
| 2 | 2384 | n.d.# | 18.5 | 125 | Matt |

TABLE 2-continued

| Example | E modulus in bending [N/mm²] | $a_n^-$ [kJ/m²] | $a_k^-$ [kJ/m²] | HDT-A [°C.] | Surface |
|---|---|---|---|---|---|
| 3 | 2191 | n.d.# | 16.0 | 121 | Glossy |
| 4 | 2490 | n.d.# | 14.0 | 127 | Glossy |
| 5 | 2116 | n.d.# | 34.0 | 122 | Glossy |
| 6 | 2341 | n.d.# | 21.0 | 127 | Glossy |

*Comparison tests
$^-a_n$ = Impact strength
$^-a_k$ = Notched impact strength
n.d. = not determined As can be seen from the Examples, the blends according to the invention are distinguished by high heat resistance, good toughness values and uniform, glossy surfaces.

We claim:

1. Polymer blends containing
A) 5 to 70% by weight polyamide,
B) 94 to 10% by weight thermoplastic aromatic poly(ester) carbonate or polycarbonate,
C) 1 to 20% by weight of a homo- or copolymer of a radical-polymerizable sulfonamide monomer and optionally another sulfonamide-free vinyl monomer and, optionally,
D) at least one of elastomer impact modifiers and typical additives.

2. Polymer blends as claimed in claim 1, wherein the sulfonamide monomers are vinyl monomers containing structural units corresponding to formula (I)

$$-SO_2-N-\atop{\phantom{-SO_2-}H}\qquad (I)$$

3. Polymer blends as claimed in claim 1, wherein the sulfonamide monomers in C) are vinyl monomers selected from at least one monomer corresponding to formulae (II) and (III)

$$H_2C=\overset{R^1}{\underset{|}{C}}-X-NH-SO_2-R^2 \qquad (II)$$

$$H_2C=\overset{R^1}{\underset{|}{C}}-Y-SO_2-NH-R^3 \qquad (III)$$

in which
$R^1$ = H or methyl,
X = single bond, $C_{1-8}$ alkylene, difunctional aromatic $C_{6-25}$ hydrocarbon radical,

$R^2 = C_{1-12}$ alkyl or monofunctional aromatic $C_{6-25}$ hydrocarbon radical,
Y = single bond, $C_{1-8}$ alkylene, difunctional aromatic $C_{6-25}$ hydrocarbon radical,

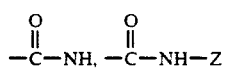

with Z = difunctional aromatic $C_{6-25}$ hydrocarbon radical, or

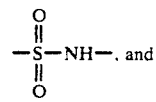

$R^3$ = hydrogen, $C_{1-12}$ alkyl (linear or branched), monofunctional aromatic $C_{6-25}$ hydrocarbon radical,

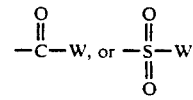

with
W = $C_{1-12}$ or a monofunctional aromatic $C_{6-25}$ hydrocarbon radical.

4. Blends as claimed in claim 1 containing as component D) at least one of impact modifiers and typical additives in effective quantities, said impact modifiers and typical additives being selected from the group consisting of lubricants, mold release agents, nucleating agents, plasticizers, stabilizers, flameproofing agents, antidripping agents, fillers, reinforcing materials, pigments, dyes, heat stabilizers, antioxidants, UV absorbers and light stabilizers.

5. Polymer blends as claimed in claim 1, wherein the polyamide in A) is present in a quantity of 10 to 60% by weight.

6. Polymer blends as claimed in claim 1, wherein the polyamide in A) is present in a quantity of 15 to 50% by weight.

7. Polymer blends as claimed in claim 1, wherein the thermoplastic aromatic poly(ester) carbonate or polycarbonate in B) is present in a quantity of 87 to 25% by weight.

8. Polymer blends as claimed in claim 1, wherein the thermoplastic aromatic poly(ester) carbonate or polycarbonate in B) is present in a quantity of 80 to 40% by weight.

9. Polymer blends as claimed in claim 1, wherein the homo- or copolymer of a radical-polymerizable sulfonamide monomer and optionally another sulfonamide-free vinyl monomer in C) is present in a quantity of 3 to 15% by weight.

10. Polymer blends as claimed in claim 1, wherein the homo- or copolymer of a radical-polymerizable sulfonamide monomer and optionally another sulfonamide-free vinyl monomer in C) is present in a quantity of 5 to 10% by weight.

11. A process for the production of the polymer blends claimed in claim 1, wherein
A) 5 to 70% by weight of a thermoplastic polyamide,
B) 94 to 10% by weight of a thermoplastic aromatic polycarbonate or poly(ester) carbonate,
C) 1 to 20% by weight of a homopolymer or copolymer of a radical-polymerizable sulfonamide vinyl monomer containing structural units $-SO_2-NH-$ and, optionally, another sulfonamide-free vinyl monomer and, optionally,
D) at least one of elastomer impact modifiers and typical additives are blended in the melt in one or more stages at temperatures of 270° to 310° C.

12. A process as claimed in claim 11, wherein polamides having an amide group content of less than 30 milliequivalents/kg are used as the polyamides A).

13. A process as claimed in claim 11, wherein said polyamide in A) is present in a quantity of 10 to 60% by weight.

14. A process as claimed in claim 11, wherein said polyamide in A) is present in a quantity of 15 to 50% by weight.

15. A process as claimed in claim 11, wherein said thermoplastic aromatic polycarbonate or poly(ester) carbonate in B) is present in a quantity of 87 to 25% by weight.

16. A process as claimed in claim 11, wherein said thermoplastic aromatic polycarbonate or poly(ester) carbonate in B) is present in a quantity of 80 to 40% by weight.

17. A process as claimed in claim 11, wherein said homopolymer or copolymer of a radical-polymerizable sulfonamide vinyl monomer containing structural units —$SO_2$—NH— and, optionally, another sulfonamide-free vinyl monomer in C) is present in a quantity of 3 to 15% by weight.

18. A process as claimed in claim 11, wherein said homopolymer or copolymer of a radical-polymerizable sulfonamide vinyl monomer containing structural units —$SO_2$—NH— and, optionally, another sulfonamide-free vinyl monomer in C) is present in a quantity of 5 to 10% by weight.

* * * * *

UNITED STATES PATENT AND TRADEMARK OFFICE
CERTIFICATE OF CORRECTION

PATENT NO. : 5,219,934
DATED : June 15, 1993
INVENTOR(S) : Heger, et al

It is certified that error appears in the above-indentified patent and that said Letters Patent is hereby corrected as shown below:

On the title page: Item [56]

The "Foreign Patent Documents" subsection of the "References Cited" section of the above-identified patent should additionally include the following:

-- WO88/02387  4/1988  World Int. Prop. O. --

The "References Cited" section should also include a subsection --Other Publications-- as follows:
Patent Abstracts of Japan, 28:2565 (C-77) of JP-A-52 72 753 (TORAY K.K.) (1977).--

Column 14, claim 3, line 20, should be corrected to read

-- $C_{1-12}$ alkyl or a monofunctional aromatic --.

Signed and Sealed this

Eighth Day of November, 1994

*Attest:*

BRUCE LEHMAN

*Attesting Officer*  *Commissioner of Patents and Trademarks*